(12) United States Patent
Barger et al.

(10) Patent No.: US 7,993,739 B2
(45) Date of Patent: Aug. 9, 2011

(54) ANISOTROPIC FOAM-FILM COMPOSITE STRUCTURES

(75) Inventors: Mark Alan Barger, Midland, MI (US); David Bland, Mason, OH (US); Michael H. Mazor, Midland, MI (US); Eric Baer, Cleveland, OH (US); Joseph Dooley, Midland, MI (US); Jerry A. Garcia, Freeland, MI (US)

(73) Assignee: Dow Global Technologies LLC, Midland, MI (US)

( * ) Notice: Subject to any disclaimer, the term of this patent is extended or adjusted under 35 U.S.C. 154(b) by 220 days.

(21) Appl. No.: 12/373,863

(22) PCT Filed: Jul. 12, 2007

(86) PCT No.: PCT/US2007/073327
§ 371 (c)(1),
(2), (4) Date: Jan. 14, 2009

(87) PCT Pub. No.: WO2008/008875
PCT Pub. Date: Jan. 17, 2008

(65) Prior Publication Data
US 2009/0263645 A1    Oct. 22, 2009

(51) Int. Cl.
*B32B 3/26* (2006.01)

(52) U.S. Cl. ............... 428/316.6; 428/314.4; 428/314.8; 428/318.6; 428/319.3; 428/319.7; 428/315.5; 428/315.7

(58) Field of Classification Search ............... 428/316.6, 428/314.4, 318.6, 319.3, 319.7, 314.8, 315.5, 428/315.7
See application file for complete search history.

(56) References Cited

U.S. PATENT DOCUMENTS

| | | |
|---|---|---|
| 3,557,265 A | 1/1971 | Chisholm et al. |
| 3,565,985 A | 2/1971 | Schrenk et al. |
| 3,645,837 A | 2/1972 | Chisholm et al. |
| 3,884,606 A | 5/1975 | Schrenk |
| 4,206,165 A | 6/1980 | Dukess |
| 4,911,978 A | 3/1990 | Tsubone et al. |
| 5,000,992 A | 3/1991 | Kelch |
| 5,202,074 A | 4/1993 | Schrenk et al. |
| 5,215,691 A | 6/1993 | Bland et al. |
| 5,272,236 A | 12/1993 | Lai et al. |
| 5,278,272 A | 1/1994 | Lai et al. |
| 5,380,810 A | 1/1995 | Lai et al. |
| 2003/0232210 A1 * | 12/2003 | Haas et al. ............... 428/500 |
| 2007/0036999 A1 * | 2/2007 | Rogers Agent et al. ... 428/475.8 |

FOREIGN PATENT DOCUMENTS

| | | |
|---|---|---|
| JP | 8072628 | 3/1996 |
| JP | 10000748 | 1/1998 |
| WO | 2005090425 A1 | 9/2005 |
| WO | 2005090426 A1 | 9/2005 |
| WO | 2005090427 A1 | 9/2005 |

OTHER PUBLICATIONS

Translation of JP 10-000748, Kazuhiko Morita, "Polypropylene-Based Resin Foam Laminated Sheet and Molding Body Thereof", Jan. 6, 1998.*
Ranade, et al., Journal of Cellular Plastics, vol. 40, Nov. 2004, pp. 497-507.

* cited by examiner

*Primary Examiner* — Hai Vo
(74) *Attorney, Agent, or Firm* — Whyte Hirschboeck Dudek SC

(57) ABSTRACT

Multilayer foam-film composite structures in which the cells of at least one foam layer have an anisotropic orientation exhibit at least one enhanced property of toughness, tear resistance and puncture resistance in comparison with a foam-film composite structure alike in all aspects except for the anisotropic orientation of the cells of at least one foam layer.

10 Claims, No Drawings

ANISOTROPIC FOAM-FILM COMPOSITE STRUCTURES

FIELD OF THE INVENTION

This invention relates to multilayer structures. In one aspect, the invention relates to foam-film multilayer structures while in another aspect, the invention relates to foam-film multilayer structures in which the foam layer comprises anisotropic cells. In yet another aspect, the invention relates to a process of preparing such structures and in still another aspect, the invention relates to the use of such structures.

BACKGROUND OF THE INVENTION

Multilayer foam-film composite structures are known, and the structures of U.S. Pat. Nos. 3,557,265 and 5,215,691 are exemplary. These structures can be made by various processes, including lamination and co-extrusion, and uses in various applications, including mailing envelopes, shipping sacks, stand-up pouches, labels, thermoformed packaging and tamper-evident packaging. However, various properties of these structures have room for improvement, particularly the properties of toughness, tear resistance and puncture resistance.

SUMMARY OF THE INVENTION

In one embodiment of this invention, multilayer foam-film composite structures in which the cells of at least one foam layer have an anisotropic orientation exhibit at least one enhanced property of toughness, tear resistance and puncture resistance in comparison with a foam-film composite structure alike in all aspects except for the anisotropic orientation of the cells of at least one foam layer. In another embodiment of the invention, the anisotropic cell orientation is imparted to the at least one foam layer in a mono-, bi- or multi-directional manner, e.g., by drawing, tenter frame or bubble blowing, or thermoforming, respectively. In still another embodiment of the invention, the multilayer foam-film composite structure is used in a packaging application.

DESCRIPTION OF THE PREFERRED EMBODIMENTS

"Anisotropic", "anisotropic orientation", "anisotropic cell orientation" and like terms mean that a typical cell in the foam layer(s) of the multilayer film-foam composite structure has an asymmetric shape, typically a shape that is larger in one dimension than it is in the other dimensions. After cell orientation, the cell anisotropy ratios (length to thickness or x to z) are typically in the range from about 2:1 to about 10:1, preferably from about 3:1 to about 5:1.

The multilayer foam-film composite structure of the invention typically comprises an A/B structure of at least two layers, preferably of 5 to about 300 layers and more preferably between about 15 and about 75 layers. The exterior layers of the structure comprise either foam or film, or one layer is film while the other layer is foam. Each of the layers is in abutting relationship with and fused to the immediate adjacent layers, and preferably the layers alternate between film and foam. The film layers comprise a solid, not-expanded thermoplastic resinous material typically having a thickness from about 0.10 microns (µm) to about 100 µm, preferably from about 0.5 µm to about 50 µm and more preferably from about 1 µm to about 30 µm. The foam layers comprise an expanded cellular thermoplastic resinous foam material typically having a thickness from about 10 µm to about 1,000 µm, preferably from about 50 µm to about 500 µm and more preferably from about 75 µm to about 300 µm. The layers are interdigitated, i.e., interleaved, and in a generally parallel relationship with one another. The cross-sectional thickness of the multilayer foam-film composite structure of this invention is dependent upon the number of layers and the thickness capacity of the extrusion equipment, but typically the thickness range is from about 10 µm to about 25 millimeters (mm), preferably from about 10 µm to about 5 mm and more preferably from about 100 µm to about 2 mm. The cells of the foam can be open or closed.

The multilayer foam-film composite structures of this invention can be prepared by various methods, e.g., feedblock and layer multiplication technology as taught in U.S. Pat. Nos. 3,557,265 and 5,202,074, sequential layering as taught in Dooley, J. and Tung, H., Co-extrusion, Encyclopedia of Polymer Science and Technology, John Wiley & Sons, Inc., New York (2002), or a direct feedblock process as taught in U.S. Pat. No. 3,884,606. In one preferred embodiment the structures are prepared by co-extrusion of at least two streams of the same or dissimilar thermoplastic materials. Co-extrusion or simultaneous extrusion of two or more synthetic resinous materials is well-known in the art and has been used for preparing sheet or film containing many layers, for example, 50, 100 or several hundred layers. This method is illustrated in U.S. Pat. Nos. 3,565,985, 3,557,265 and 3,884,606.

Co-extrusion can be broadly described as a method for preparing a composite stream of interdigitated diverse synthetic resinous materials in which at least one of the materials comprises a thermoplastic resinous composition containing at least one blowing or expansion agent, comprising providing at least a first stream of heat-plastified synthetic resinous material and a second stream of heat-plastified thermoplastic material neither of which streams contain blowing or expansion agents, adding to at least of the heat-plastified streams at least one blowing agent under a pressure which is sufficient to substantially inhibit activity of the blowing agent, dividing each of the streams into a plurality of first substreams and a plurality of second substreams, respectively, combining the substreams to form a composite stream having the first substreams and the second substreams interdigitated, and forming the stream into a desired configuration having at least one major surface in which the layers of the composite stream lie generally parallel to a major surface of the desired configuration. The division of the individual streams of heat-plastified thermoplastic into a plurality of substreams and the combination of the substreams into a composite stream of interdigitated layers is effected in a layer multiplying-combining means such as the feedblock and die assembly shown in FIGS. 2-4, 6 and 7 of U.S. Pat. No. 3,557,265.

The multilayer film-foam composite structure is subjected to drawing (mono-, bi- or multi-axial) while in the molten state to achieve macroscopic cellular orientation. Examples of drawing include, but are not limited to, (i) mono-axial drawing between a slot die and a film or sheet casting roll, (ii) Parison inflation, either for free surface bubble blowing (bi-axial), or inflation into a mold (blow molding, multi-axial), (iii) tenter-frame stretching, either simultaneous or sequential bi-axial, and (iv) in-line vacuum forming (multi-axial). Typical drawing ratios (based on a mono-axial drawing process) range from about 2:1 to about 10:1, preferably from about 3:1 to about 5:1.

For dimensioned articles, the multi-layer film-foam composite structure can be re-heated to effect the stretching operation. Once drawn or stretched, the multi-layer film-foam composite structure is stabilized by cooling, either assisted (e.g., chiller rolls, quenching, etc.) or unassisted, i.e., equilibrating to ambient temperature.

Most any thermoplastic polymeric material which can be formed into a film or which can be blown, i.e., foamed, can be employed in the practice of the invention including, without limitation, thermoplastic polyolefins, aliphatic and aromatic polyesters, polyurethanes and various blends of these materials. These and other polymers can be used either as an expandable polymeric composition, or a film-forming composition, or the same polymeric material can be employed for each purpose, e.g., polystyrene can be employed as both an expandable polymer and as a film-forming polymer in the same multilayer foam-film composite structure.

Many thermoplastic polyolefins are well-suited for use in the practice of this invention, and these include such polyolefins as polyethylene, polypropylene and polybutylene, polyvinylchloride (both rigid and flexible), polystyrene, ethylcellulose, poly(vinylchloride)-vinylidene chloride, polymethylmethacrylate and the like. Specific examples of olefinic polymers useful in this invention include ultra-low density polyethylene (ULDPE, e.g., ATTANE™ ethylene/1-octene polyethylene made by The Dow Chemical Company ("Dow") with a typical density between about 0.900 and 0.925 and a typical melt index ($I_2$) between about 0.5 and 10), linear low density polyethylene (LLDPE, e.g., DOWLEX™ ethylene/1-octene polyethylene made by Dow with a typical density between about 0.92 and 0.94 and a typical $I_2$ between about 0.5 and 30), homogeneously branched, linear ethylene/α-olefin copolymers (e.g., TAFMER® polymers by Mitsui Chemicals America, Inc. and EXACT™ polymers by ExxonMobil Chemical (ExxonMobil)), homogeneously branched, substantially linear ethylene/α-olefin polymers (e.g., AFFINITY™ and ENGAGE™ polymers made by Dow and described in U.S. Pat. Nos. 5,272,236, 5,278,272 and 5,380,810), catalytic linear statistical olefin copolymers (e.g., INFUSE™ polyethylene/olefin block polymers, particularly polyethylene/α-olefin block polymers and especially polyethylene/1-octene block polymers, made by Dow and described in WO 2005/090425, 2005/090426 and 2005/090427), and high pressure, free radical polymerized ethylene copolymers such as ethylene/vinyl acetate (EVA) and ethylene/acrylate and ethylene/methacrylate polymers (e.g., ELVAX® and ELVALOY® polymers, respectively, by E. I. Du Pont du Nemours & Co. (Du Pont)) and ethylene/acrylic and ethylene/methacrylic acid (e.g., PRIMACOR™ EAA polymers by Dow and NUCREL EMAA polymers by Du Pont), and various polypropylene resins (e.g., INSPIRE® and VERSIFY® polypropylene resins made by Dow and VISTAMAXX® polypropylene resins made by ExxonMobil).

Most any of the known blowing agents can be employed, including gaseous materials, volatile liquids and chemical agents which decompose into a gas and other byproducts. Representative blowing agents include, without limitation, nitrogen, carbon dioxide, air, methyl chloride, ethyl chloride, pentane, isopentane, perfluoromethane, chlorotrifluoromethane, dichlorodifluoromethane, trichlorofluoromethane, perfluoroethane, 1-chloro-1,1-difluoroethane, chloropentafluoroethane, dichlorotetrafluoroethane, trichlorotrifluoroethane, perfluoropropane, chloroheptafluoropropane, dichlorohexafluoropropane, perfluorobutane, chlorononafluorobutane, perfluorocyclobutane, azodicarbonamide, azodiisobutyronitrile, benzenesulfonhydrazide, 4,4-oxybenzene sulfonyl-semicarbazide, p-toluene sulfonyl semicarbazide, barium azodicarboxylate, N,N'dimethyl-N,N'-dinitrosoterephthalamide, and trihydrazino triazine. Currently, the partially halogenated hydrocarbons are preferred blowing agents. Generally, the blowing agent will be incorporated into the resin composition which is to be foamed in amounts ranging from 1 to 100 parts by weight of blowing or expansion agent per 100 parts of polymer. The addition of a small amount of expansion agent, e.g., 0.1 to 1 part of expansion agent per 100 parts of polymer, to the film-forming composition has been found to improve compatibility and adhesion between the foam and film layers. Film quality is also improved by practicing this variant. The blowing agent must be incorporated into its melt stream under a pressure which is sufficient to inhibit its activation, that is, to inhibit foaming of the melt stream during the incorporation of the expansion agent and subsequent processing of the composition until the stream is expressed through the co-extrusion die. Generally, this pressure should be at least 500 psig and is preferably at least 1000 psig.

The density of each foam layer is typically in the range of about 0.03 to about 0.8, preferably in the range of about 0.10 to about 0.5, grams per cubic centimeter (g/cc) as measured by ASTM D 3575-93 W-B. The density of the multi-layer film-foam composite structure is typically in the range from about 0.05 to about 0.9, preferably in the range of about 0.15 to about 0.6 g/cc.

The multi-layer film-foam composite structure can comprise one or more skin or cap layers to improve flow stability of the structure through the die. If present, each skin layer can comprise greater than zero up to about 40 percent by weight based on the total weight of the structure, preferably between about 5 and about 30 percent by weight. The skin layer can be non-adhering such that it can be removed from the rest of the structure after manufacture. Moreover, the multi-layer film-foam composite structure can incorporate one or more functionalities such as a gas barrier layer (e.g., a film layer of ethylene vinyl alcohol copolymer or polyvinylidene chloride) or an oxygen scavenger formulation.

Additives which are commonly incorporated into expandable polymer compositions, such as catalysts or accelerators, surfactants, flame retardant additives, porosity control agents, antioxidants, colorants, pigments, fillers and the like can be incorporated into the composite of the invention. Such additives will generally be used in conventional amounts. In a particularly preferred embodiment, it has been found that incorporating from 0.1 to 25, preferably 1 to 20 and most preferably 5 to 15, percent by weight of carbon black into the extrudable polymer compositions, especially those polymer compositions which contain no expansion agent or only a small property-improving amount of expansion agent, provides products having an enhanced insulation value.

The multi-layer film-foam composite structures of this invention have a multiplicity of potential uses, and they provide certain advantages over structures more conventionally used in these applications. The following is a non-limiting representation of these uses:

Medium-density, thermoformable sheets, both flexible and rigid, for use in automotive, durables, appliance and packaging applications. The structures of this invention often display lower mass and better retention of physical, tensile and/or flexibility properties that are important to these applications than many conventional alternatives.

Acoustic panels and underlayments for use in automotive, building and construction, and appliance applications. The structures of this invention often are more durable than cork and can carry a decorative surface.

Puncture-resistant articles such as mailing envelopes, shipping sacks and bags (e.g., cement bags), pouches, low-density membranes (e.g., single-ply roofing), and meat-wrap film.

Articles made by stretch and extrusion blow molding. Articles made with the technology of this invention often display lower mass and have better insulation properties than similar articles otherwise made.

Films such as down-gauged (mass) films; biodegradable mulch film; tear-resistant, low-density shrink wrap film and tarp; abuse-resistant blister packaging; and opacity-enhanced films.

Oxygen, water and/or chemical barrier foam-film composites (e.g., for food, medical, electronic packaging).

Insulation and/or ballistic-resistant house wrap.

Low dielectric materials such as wire and cable sheathing, and semi-conductive sheets for electronics.

Elastic tape—high strength for industrial, automotive (mounting tape), and wound care (bandages).

Decorative labels, and labels or tags with high tear-strength and insulation properties.

Artificial leather having tear-resistance and haptics (e.g., for clothing and footware).

Breathable fabric for protective clothing.

Synthetic cork for interior walls and offices.

Pressure-sensitive adhesive tapes for attachment and assembly.

Automotive interior applications (e.g., instrument panel skins, automotive carpet, headliner, door panel, cushioning under seat fabrics, dash mat, floor mats and sun shades).

Filled-systems for coefficient of thermal expansion control.

Dimensionally stable, moisture-absorbent systems.

Protective composite structures for industrial, safety or commercial shipping applications.

Foliated structures (e.g., perpendicular layers) for controlled permeation.

Structures in which additives that interfere with foaming (e.g., fire retardants, inorganic fillers, active packaging additives, etc.) are positioned in the film component.

Positioning functional additives in the cellular component for functionality; e.g., tamper resistant indicators, ion exchange additives, oxygen scavengers and permeation control.

Plastic paper or paperboard.

Low-density plastic composites for building and construction applications (e.g., decks, siding, fencing, shingles, insulation sheathing).

Elastic structures with non-woven properties.

Light-weight, microwavable, plastic containers with insulation properties.

Corrugated sheet.

Insulative low-density tubing or pipe (pressurized or non-pressurized).

Pipe wraps having insulation and/or sound deadening properties.

Extruded profiles and gaskets for window and door seals (automotive, building and construction and appliance applications).

Gaskets and cap liners for automotive, industrial, and packaging (including beverage) applications.

Tear-resistant tapes for industrial strapping.

Heating, ventilation and air conditioning ducting having insulation and acoustic and vibration damping for automotive, building and construction applications.

Cell-size control for improved processability in thin sheet and film (e.g., reduction in web breaks) applications.

Alternatives to film-laminated skived foams.

Artificial turf with improved tear strength (Recreation market).

Constrained layer for quiet steel technology (metal-plastic laminate for noise and vibration damping).

Marine interiors (e.g., light weight, water-resistant, soft touch, non-skid applications).

The following examples are illustrative of certain specific embodiments of this invention. Unless indicated otherwise, all parts and percentages are by weight. Controls have a draw speed of 1×; inventive examples have a draw speed of greater than 1×.

SPECIFIC EMBODIMENTS

Foam-film samples with different degrees of macro-cellular orientation are prepared using a co-extrusion line that consists of two 0.75 inch diameter single screw extruders that feed two components. One component contains a chemical foaming agent through gear pumps into a two layer A/B feedblock and a series of two channel layer multipliers similar in design to those described in U.S. Pat. No. 5,202,074. The multiplied layered feed-stream is then forwarded into a die having cross-sectional dimensions of 7.6×0.2 centimeters (cm) (width×thickness). The expanded foam material is extruded onto a chilled casting roll equipped with an air knife. The speed of the casting roll is varied in order to draw the sample in the machine direction and orient the cellular structure. Overall extrusion rate is held constant at approximately 2.3 kilograms per hour (kg/hr).

Extrudates are subsequently prepared and characterized for cell size using a stereo-optical microscope. Average cell size with respect to the machine (length), width and thickness directions (x, y and z, respectively) is determined via manual cell count, and an anisotropy ratio is expressed as the ratio of cell sizes in the x and z directions, respectively. Average cell size of the undrawn examples is obtained by averaging the dimensions in the three orthogonal directions. Density is calculated in accordance with ASTM D3575-93 W-B, and tensile properties are determined by testing die cut samples (dimensions 22 mm×4.8 mm×sheet thickness at a strain rate of 100%/minute in an Instron Universal Testing machine. All testing is conducted at ambient conditions (about 23 C and atmospheric pressure).

The conditions and results are report in Tables 1 and 2. Examples 1, 3, 5, 7, 10, 12, 15 and 17 are controls (the draw speed of each was 1×). Those examples in which the film consists of three layers has a higher density than the remaining examples. Regarding cell size, Z is a measure of the vertical, Y of the transverse or width, and X of machine direction or length. As is evident from these results, the drawn samples exhibit significant enhancements in machine direction elongation with insignificant change in transverse direction toughness at lower density compared to their three layer analogs.

| | Materials | | | | | | |
|---|---|---|---|---|---|---|---|
| | Foam Component | | Film Component | | Foaming Agent | | |
| Ex. # | Resin Grade | vol. %[1] | Resin Grade | vol. %[1] | Compound | Wt %[2] | Number of Layers |
| 1 | [3]PP PF-814 | 50 | [3]PP PF-814 | 50 | Azodicarbonamide | 1.75 | 32 |
| 2 | PP PF-814 | 50 | PP PF-814 | 50 | Azodicarbonamide | 1.75 | 3 |
| 3 | TPO Blend | 70 | AFFINITY PL-1880 | 30 | Azodicarbonamide | 2 | 16 |
| 4 | TPO Blend | 70 | AFFINITY PL-1880 | 30 | Azodicarbonamide | 2 | 16 |
| 5 | TPO Blend | 70 | AFFINITY PL-1880 | 30 | Azodicarbonamide | 1 | 32 |
| 6 | TPO Blend | 70 | AFFINITY PL-1880 | 30 | Azodicarbonamide | 1 | 32 |
| 7 | TPO Blend | 70 | AFFINITY PL-1880 | 30 | Azodicarbonamide | 1 | 3 |
| 8 | TPO Blend | 70 | AFFINITY PL-1880 | 30 | Azodicarbonamide | 1 | 3 |
| 9 | TPO Blend | 70 | AFFINITY PL-1880 | 30 | Azodicarbonamide | 1 | 3 |
| 10 | [4]AFFINITY EG8200 | 50 | LDPE 503A | 50 | SAFOAM FPE-50 | 2.5 | 32 |
| 11 | AFFINITY EG8200 | 50 | LDPE 503A | 50 | SAFOAM FPE-50 | 2.5 | 32 |
| 12 | AFFINITY EG8200 | 50 | LDPE 503A | 50 | SAFOAM FPE-50 | 2.5 | 3 |
| 13 | AFFINITY EG8200 | 50 | LDPE 503A | 50 | SAFOAM FPE-50 | 2.5 | 3 |
| 14 | AFFINITY EG8200 | 50 | LDPE 503A | 50 | SAFOAM FPE-50 | 2.5 | 3 |
| 15 | [6]LDPE 503A Blend** | 86 | EVOH-44# | 14 | SAFOAM FPE-50 | 2.5 | 17 |
| 16 | LDPE 503A Blend** | 86 | EVOH-44# | 14 | SAFOAM FPE-50 | 2.5 | 17 |
| 17 | LDPE 503A Blend** | 86 | EVOH-27# | 14 | SAFOAM FPE-50 | 2.5 | 17 |
| 18 | LDPE 503A Blend** | 86 | EVOH-27# | 14 | SAFOAM FPE-50 | 2.5 | 17 |

| | Extruder Temperature (C.) | | Additional Temperatures (C.) | | | |
|---|---|---|---|---|---|---|
| Ex. # | Foam Component | Film Component | Feed-block | Multipliers | Die | Draw Speed |
| 1 | 210 | 210 | 210 | 210 | 160 | 1x |
| 2 | 210 | 210 | 210 | 210 | 160 | 2x |
| 3 | 210 | 210 | 210 | 210 | 160 | 1x |
| 4 | 210 | 210 | 210 | 210 | 160 | 3x |
| 5 | 210 | 210 | 210 | 210 | 160 | 1x |
| 6 | 210 | 210 | 210 | 210 | 160 | 4x |
| 7 | 210 | 210 | 210 | 210 | 160 | 1x |
| 8 | 210 | 210 | 210 | 210 | 160 | 2x |
| 9 | 210 | 210 | 210 | 210 | 160 | 3x |
| 10 | 215 | 215 | 215 | 215 | 155 | 1x |
| 11 | 215 | 215 | 215 | 215 | 155 | 4x |
| 12 | 215 | 215 | 215 | 215 | 155 | 1x |
| 13 | 215 | 215 | 215 | 215 | 155 | 2x |
| 14 | 215 | 215 | 215 | 215 | 155 | 3x |
| 15 | 215 | 215 | 215 | 215 | 155 | 1x |
| 16 | 215 | 215 | 215 | 215 | 155 | 2x |

-continued

| | | | | | | |
|---|---|---|---|---|---|---|
| 17 | 215 | 215 | 215 | 215 | 155 | 1x |
| 18 | 215 | 215 | 215 | 215 | 155 | 2x |

[1] vol % based on volumetric flow rates of unexpanded (solid) polymer
[2] wt %, loading based on Foamable Component
[3] Pro-fax PF814 polypropylene homopolymer of high melt strength by Basell (MFR of 3.0 and density of 0.902 g/cc)
[4] AFFINITY PL1880 ethylene/1-octene copolymer by Dow (MFR of 1.0 and density of 0.902 g/cc)
[5] ADFLEX Q200F low modulus thermoplastic olefin resin by Basell (MFR of 0.8 and density of 0.882 g/cc)
[6] LDPE 503A by Dow (MFR of 1.9 and density of 0.923 g/cc)
[7] FUSABOND N MN493D MAH-grafted ethylene/1-octene copolymer by Dupont (MFR of 1.2 and density of 0.87 g/cc)
[8] EVAL L171 ethylene/vinyl alcohol copolymer by EVALCA (MFR of 4.0 and density of 1.20 g/cc)
[9] EVAL E171 ethylene/vinyl alcohol copolymer by EVALCA (MFR of 3.3 and density of 1.14)
EVOH-Ethylene vinyl alcohol copolymer number indicates mole % ethylene in copolymer TPO Blend is 75/25 w/w mixture of two polypropylene resins, PF-814 and [3]Adflex OF-200, both supplied by Basell Inc.
**A-90/10 w/w blend of LDPE/[7]Fusabond MN-493D Barner Foam-Film Samples (15-18) used Skin layers of 503A (Incorporated into film component as % Film in the Table
All MFR measured according to ASTM D 1238 and 2.16 kg. Pro-fax and Adflex measured at 230 C.; AFFINITY, LDPE 503A measured at 190 C.; and EVAL L171 and E171 easured at 210 C.

| Ex. # | Overall Density (g/cc) | Foam Density (g/cc) | Final Thickness (mils) | Cell Size (microns) Z | Y | X | Anisotrophy Ratio (X/Z) | Tensile Properties (Machine Direction) Break Stress (Pa) | Break @ Elongation (%) | Tensile Properties (Traverse Direction) Break Stress (Pa) | Break @ Elongation (%) |
|---|---|---|---|---|---|---|---|---|---|---|---|
| 1 | 0.3 | 0.18 | | 100 | | | 1 | 7.5 | 12 | 6.5 | 12 |
| 2 | | | 75 | 575 | 650 | 1100 | 1.9 | 10 | 4.4 | 5.4 | 60 |
| 3 | | 0.28 | | 70 | | | 1 | 6.5 | 270 | 6.5 | 270 |
| 4 | | 0.28 | | 30 | 35 | 150 | 5 | 10.5 | 490 | 5.5 | 280 |
| 5 | 0.35 | 0.21 | 70 | 90 | | | 1 | 6 | 180 | 6.5 | 260 |
| 6 | 0.35 | 0.21 | 25 | 50 | 65 | 185 | 3.7 | 13.4 | 550 | 5.8 | 230 |
| 7 | 0.57 | 0.35 | 89 | 215 | | | 1 | 10.6 | 276 | 1 | 260 |
| 8 | | | | | | | | 14.6 | 404 | 7.8 | 260 |
| 9 | 0.62 | | 61 | 560 | 7580 | 1500 | 2.7 | 8.9 | 230 | 5 | 102 |
| 10 | 0.48 | 0.32 | 55 | 70 | | | 1 | 13.8 | 250 | 12.7 | 230 |
| 11 | | | | | | | | 25 | 280 | 14.2 | 250 |
| 12 | 0.66 | 0.51 | 71 | 400 | | | 1 | 8 | 438 | 7 | 417 |
| 13 | 0.69 | | 63 | 290 | 390 | 750 | 2.6 | | | | |
| 14 | 0.71 | | 35 | 93 | 210 | 422 | 4.5 | 9.3 | 363 | 5.2 | 314 |
| 15 | 0.38 | 0.26 | | 200 | | 160 | 0.8 | 8 | 155 | 4.5 | 40 |
| 16 | 0.49 | 0.36 | | 180 | | 220 | 1.2 | 7.9 | 150 | 4.2 | 29 |
| 17 | 0.52 | 0.39 | | 350 | | 240 | 0.7 | 7.5 | 37 | 5 | 16 |
| 18 | 0.42 | 0.29 | | 150 | | 120 | 0.8 | 6.7 | 41 | 5 | 20 |

'wt %, loading based on Foamable Component
^vol % based on volumetric flow rates of unexpanded (solid) polymer
EVOH-Ethylene vinyl alcohol copolymer number indicates mole % ethylene in copolymer TPO Blend is 75/25 w/w mixture of two polypropytlene resins, PF-814 and Adflex OF-200, both supplied by Bassell Inc.
** A-90/10 w/w blend of LDPE/Fusabond N MN493D Barner Foam-Film Samples (15-18) used Skin layers of 503A (Incorporated into film component as % Film in the Table Although the invention has been described in considerable detail by the preceding examples, this detail is for the purpose of illustration and is not to be construed as a limitation upon the invention as described in the following claims. All United States patents and published patent applications cited in the specification are incorporated herein by reference.

What is claimed is:

1. A multilayer film-foam composite structure comprising at least five layers of which two are foam layers and three are film layers and in which the foam and film layers alternate, each foam layer comprising anisotropic cells that have a cell anisotropy length to thickness ratio from about 2:1 to about 10:1, and wherein each foam layer has foam cells with an average cell size from 120 to 1100 microns.

2. The structure of claim 1 comprising at least fifteen layers of which at least seven layers are film and at least seven layers are foam.

3. The structure of claim 2 wherein the external layers are film layers.

4. The structure of claim 2 wherein the external layers are foam layers.

5. The structure of claim 1 in which at least one of the film and foam layers comprises a polyolefin.

6. The structure of claim 1 in which at least one film layer and at least one foam layer comprises a polyolefin.

7. The structure of claim 6 in which the polyolefin is a polyethylene or polypropylene.

8. The structure of claim 1 comprising at least one of an oxygen, water and chemical barrier layer.

9. The structure of claim 1 in which the cells of the foam layers are open.

10. The structure of claim 1 in which the cells of the foam layers are closed.

* * * * *